(12) United States Patent
So et al.

(10) Patent No.: US 7,965,738 B2
(45) Date of Patent: Jun. 21, 2011

(54) SYSTEM AND METHOD FOR ADAPTIVE FRAME SIZE MANAGEMENT IN A WIRELESS MULTIHOP NETWORK

(75) Inventors: Tricci So, Kanata (CA); Kelvin Kar-Kin Au, Ottawa (CA); Shalini Periyalwar, Nepean (CA); Peter Hazy, Kanata (CA); Sophie Vrzic, Nepean (CA); Hongyi Li, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 803 days.

(21) Appl. No.: 11/685,069

(22) Filed: Mar. 12, 2007

(65) Prior Publication Data
US 2007/0195820 A1   Aug. 23, 2007

Related U.S. Application Data

(63) Continuation of application No. PCT/IB2005/002665, filed on Sep. 9, 2005.

(60) Provisional application No. 60/608,567, filed on Sep. 10, 2004.

(51) Int. Cl.
*H04J 3/16* (2006.01)
(52) U.S. Cl. ........................................ 370/470; 370/252
(58) Field of Classification Search .......... 370/470–476, 370/252, 253, 229–236
See application file for complete search history.

(56) References Cited

U.S. PATENT DOCUMENTS

| 4,720,829 | A | 1/1988 | Fukasawa et al. | |
|---|---|---|---|---|
| 6,724,777 | B1 | 4/2004 | Yamazaki et al. | |
| 6,728,259 | B1 | 4/2004 | Gronberg | |
| 7,065,482 | B2 * | 6/2006 | Shorey et al. | 709/224 |
| 7,336,634 | B2 | 2/2008 | del Prado et al. | |
| 7,349,400 | B2 * | 3/2008 | Khirman | 370/394 |
| 7,620,409 | B2 * | 11/2009 | Budampati et al. | 455/502 |
| 2001/0015956 | A1 * | 8/2001 | Ono | 370/229 |
| 2003/0083088 | A1 | 5/2003 | Chang et al. | |
| 2005/0128998 | A1 * | 6/2005 | Jelitto et al. | 370/349 |
| 2005/0286410 | A1 | 12/2005 | Truong et al. | |
| 2006/0182016 | A1 * | 8/2006 | Walker et al. | 370/208 |
| 2006/0265488 | A1 * | 11/2006 | Tuttle et al. | 709/223 |

* cited by examiner

*Primary Examiner* — Ricky Ngo
*Assistant Examiner* — Gary Mui
(74) *Attorney, Agent, or Firm* — Slater & Matsil, L.L.P.

(57) ABSTRACT

A system and method for adaptively managing frame size in a wireless multihop network (100) is disclosed. In one embodiment, a packet is transmitted from a source to a destination (420). A acknowledgement packet (422) is received and a successful acknowledgement packet counter is incremented if the acknowledgement packet arrives prior to a time-out of a timer (444). A frame size is increased if the successful acknowledgement packet counter reaches a specified value (446, 448). If the acknowledgement packet arrives after the time-out of the timer, the successful acknowledgement packet counter (460) is reset and the frame size (462) is decreased. These procedures can be repeated until the frame size is greater than or equal to a maximum frame size (450) or less than or equal to a minimum frame size (464).

20 Claims, 6 Drawing Sheets

SYSTEM AND METHOD FOR ADAPTIVE FRAME SIZE MANAGEMENT IN A WIRELESS MULTIHOP NETWORK

This application is a continuation of PCT application international application no. PCT/IB2005/002665, which was filed on Sep. 9, 2005, which claims the benefit of U.S. Provisional Application No. 60/608,567, filed on Sep. 10, 2004, entitled "Methods of Adaptive Frame Size Management in a Wireless Multihop Network," which applications are hereby incorporated herein by reference.

TECHNICAL FIELD

The present invention relates generally to a system and method for digital communications, and more particularly to a system and method for adaptively managing frame size in a wireless multihop network.

BACKGROUND

A wireless multihop network is a wireless network formed with multiple nodes where traffic (data traffic, control traffic, and so forth) from a source to a destination can traverse one or more intermediate nodes, with the traffic being transmitted over wireless links. Depending upon network configuration, special nodes (called portals) may exist in the wireless multihop network. Portals permit traffic flow in and out of the wireless multihop network, for example, a portal can connect disjoint wireless multihop networks, provide connectivity to wired networks, access to the Internet, and so on.

Information being carried in the traffic is typically formed into packets prior to transmission. Performance of a wireless multihop network, such as link throughput, in general, is limited by media access control (MAC) and physical (PHY) layer overhead that is associated with each packet. Packet overhead may include control and header information that is part of each packet as well as media contention time that contributes to a total time required for a packet to reach its destination. For example, in IEEE 802.11 wireless networks, packet overhead is a main source of throughput degradation.

A prior art technique used to reduce packet overhead is to combine multiple small packets into a large frame. The percentage of control and header information to actual data is lower for the large frame than for the multiple small packets. Furthermore, the media contention time is incurred only once in the transmission of the large frame instead of multiple times in the transmission of the multiple small packets that are contained in the large frame.

One disadvantage of the prior art is that for wireless links with relatively low quality, the probability of the successful transmission of a large frame is smaller than the probability of successfully transmitting multiple small packets. Therefore, if the transmission of a large frame fails, a retransmission will be required, which will increase the overall overhead of transmitting the data contained within the large frame. If the quality of the wireless links is particularly bad, the transmission of the large frame may never succeed and the wireless network can be flooded with retransmission attempts of the large frame to the point of potentially preventing the successful transmission of even small packets.

A second disadvantage of the prior art is that only single wireless links are taken into consideration when concatenating multiple packets into the large frame. If a source to destination path requires that multiple wireless links be traversed, the use of a single wireless link to determine a frame size can result in a frame size that is too large for reliable message transmission.

SUMMARY OF THE INVENTION

These and other problems are generally solved or circumvented, and technical advantages are generally achieved, by preferred embodiments of the present invention which provides a system and method for adaptively managing frame size in a wireless multihop network.

In accordance with a preferred embodiment of the present invention, a method for determining frame size in a wireless multihop network is provided. The method includes transmitting a packet from a source to a destination and receiving an acknowledgement packet at the source. The method also includes incrementing a successful acknowledgement packet counter if the acknowledgement packet arrives at the source prior to a time-out of a timer. Furthermore, the method includes increasing the frame size if the successful acknowledgement packet counter reaches a specified value. However, if the acknowledgment packet arrives at the source after the time-out of the timer, then the method includes resetting the successful acknowledgement packet counter and decreasing the frame size. The method further includes repeating the transmitting, the receiving, the incrementing, the increasing, the resetting, and the decreasing until the frame size is either greater than or equal to a maximum frame size or less than or equal to a minimum frame size.

In accordance with another preferred embodiment of the present invention, a method for determining frame size in a wireless multihop network is provided. The method includes sorting outgoing packets of each node in the wireless multihop network and processing for transmission each outgoing packet. The sorting is based upon each outgoing packet's next hop routing address or final destination address. The processing of the outgoing packets includes adjusting the frame size based upon feedback information indicating the quality of a wireless link used to transmit the outgoing packets.

In accordance with another preferred embodiment of the present invention, a node in a wireless multihop network is provided. The node includes a packet pre-processor coupled to a plurality of media access layer and physical layer (MAC/PHY) interfaces and a packet forwarder coupled to the packet pre-processor. The packet pre-processor includes a packet handler coupled to the plurality of MAC/PHY interfaces and an adaptive frame size management entity (AFSME) coupled to the packet handler. The packet hander controls processing of incoming and outgoing packets and the AFSME differentiates packets based on priorities and classes, adjusts frame size to meet wireless link conditions, and provides source-to-destination frame size management. The packet forwarder takes incoming frames destined for a different node and provides the incoming frames to the packet pre-processor.

An advantage of a preferred embodiment of the present invention is that the quality of each wireless link involved in the transmission of packets from a source to a destination is considered in the determination of a size of a large frame. This can reduce the probability of retransmission due to failed transmissions and can result in improved performance.

A further advantage of a preferred embodiment of the present invention is that large frame size can be optimized for each wireless link involved in the transmission of packets from a source to a destination.

Yet another advantage of a preferred embodiment of the present invention is that frame size optimization can occur on an individual wireless link basis or over an entire path between the source and the destination.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a wireless multihop network making use of the IEEE 802.11 technical standards. The invention may also be applied, however, to other wireless multihop networks making use of other MAC and PHY specifications wherein there is a capability to change transmission frame size, such as in wireless mesh configuration networks that are IEEE 802.16 compliant.

Figure 1:
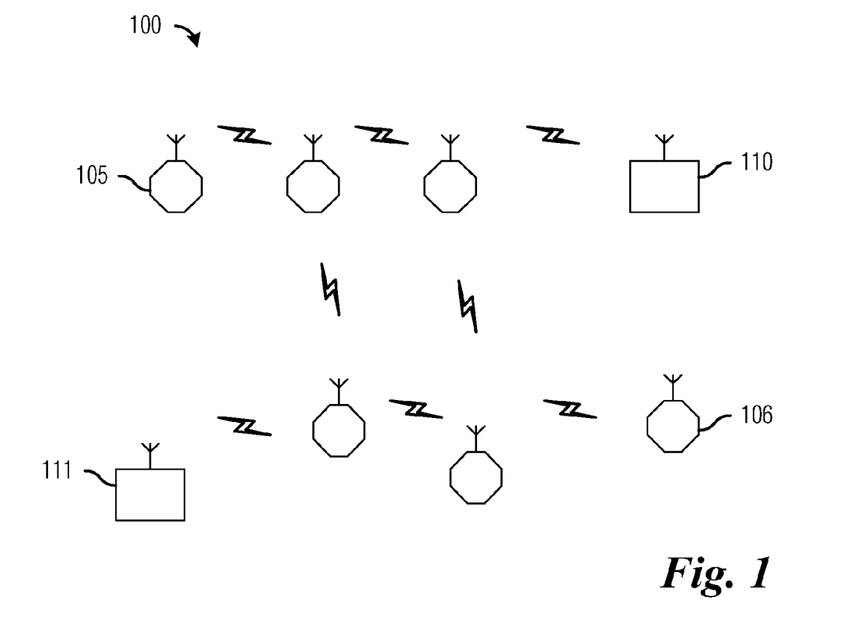
FIG. 1 is a diagram of an exemplary wireless multihop network.

With reference now to FIG. 1, there is shown a diagram illustrating an exemplary wireless multihop network 100. The wireless multihop network 100 includes a plurality of nodes, such as node 105 and node 106. The nodes permit computers and/or devices (neither shown) to wirelessly connect to the wireless multihop network 100 and communicate and share data. For example, the nodes can communicate using IEEE 802.11 MAC and PHY compliant layers. In addition to the nodes, the wireless multihop network 100 can include special nodes (referred to herein as portals), such as portal 110 and portal 111. The portals permit traffic flow into and out of the wireless multihop network 110. The portals can connect multiple disjoint wireless multihop networks, provide connectivity to wired networks, access to the Internet, and so forth.

Figure 2:
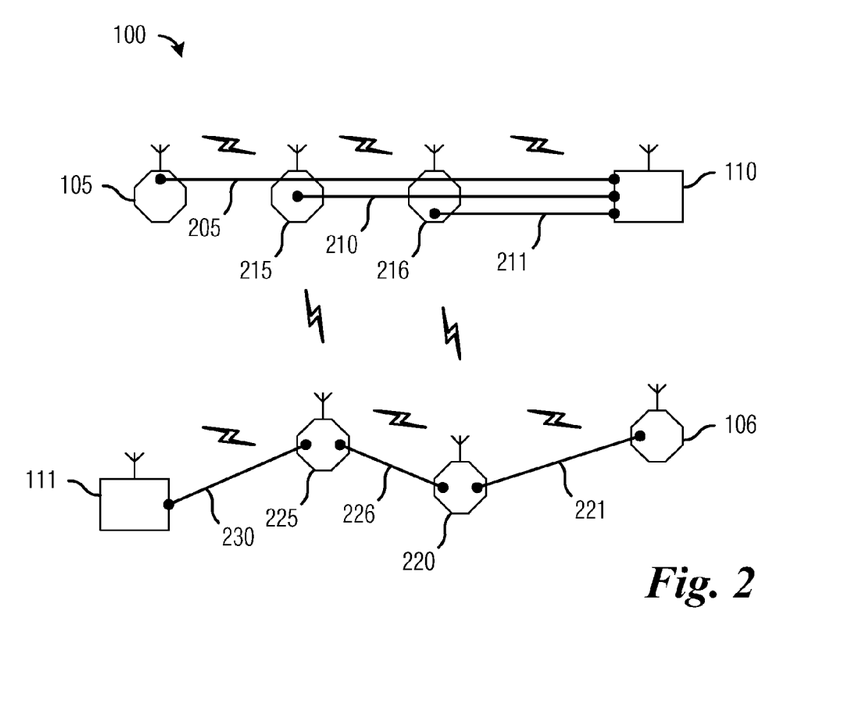
FIG. 2 is a diagram of an exemplary wireless multihop network illustrating two different operating modes.

With reference now to FIG. 2, there is shown a diagram illustrating two different operating modes for transmitting packets in a wireless multihop network 100. There are several different modes for transmitting packets in a wireless multihop network. A first mode involves the forwarding of packets across individual wireless links between a source node and a destination node, while a second mode involves the creation of a "tunnel" between the source node and the destination node. A tunnel is a logical grouping of wireless links between the source node and the destination node. As shown in FIG. 2, a first tunnel 205 connects the node 105 to the portal 110, a second tunnel 210 connects a node 215 to the portal 110, and a third tunnel 211 connects a node 216 to the portal 110. Although logically distinct, the wireless links making up a tunnel may be shared between different tunnels. For example, a wireless link in the third tunnel 211 can be a part of the second tunnel 210 and the first tunnel 205.

If operating in either a tunnel mode or a non-tunnel mode, it is possible for packets originating at the same source to traverse different sets of wireless links to get to the same destination. As shown in FIG. 2, a first wireless link 221 connects the node 106 to a node 220, a second wireless link 226 connects the node 220 to a node 225, and a third wireless link 230 connects the node 225 to the portal 111. Although not shown, a node may participate in both tunnel mode and non-tunnel mode. For example, a non-tunnel mode transmission from the portal 111 to the portal 110 can traverse wireless links connecting the portal 111 to the node 225 to the node 216 and to the portal 110, with the transmission taking place over a wireless link between the node 216 and the portal 110, which also supports the third tunnel 211. Although the discussion focuses on communication between a node and a portal, it is possible for communications to take place between node and node. A tunnel can originate at either a node or a portal and can terminate at a node or a portal. A portal is a special case of a node and in many instances can be considered another node.

Figure 3:
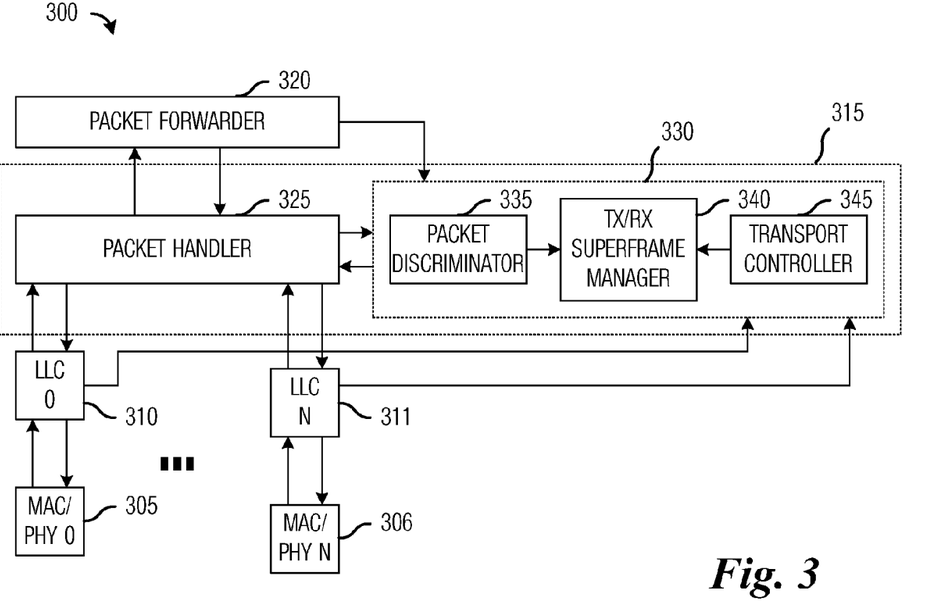
FIG. 3 is a diagram of a functional view of a node of a wireless multihop network, according to a preferred embodiment of the present invention.

With reference now to FIG. 3, there is shown a diagram illustrating a functional view of a node 300 of a wireless multihop network, according to a preferred embodiment of the present invention. The diagram of the node 300 may also be representative of a portal. The node 300 includes a plurality of MAC/PHY interfaces, such as MAC/PHY interface 305 and MAC/PHY interface 306, and a plurality of link layer controllers, such as link layer controller 310 and link layer controller 311. The MAC/PHY interfaces can serve as intermediaries between the node 300 and wireless (and wired) links coming into and out of the node 300. The node 300 also includes a packet preprocessor 315 that can be used to combine packets into frames, split frames into packets, determine an optimum packet size based upon wireless link conditions, and so forth. A packet forwarder 320 can take a packet (or frame) arriving at the node 300 but intended for a different node and provide the packet to the packet preprocessor 315 to prepare it for retransmission.

The packet preprocessor 315 includes a packet handler 325 that can be used to control the processing of incoming and outgoing packets. The packet preprocessor 315 can also include an adaptive frame size management entity (AFSME) 330. The AFSME 330 can have several different modes of operation depending upon whether the wireless multihop network is employing tunneling or not. Since packet transmissions can occur between any pair of nodes in the wireless multihop network, the AFSME 330 can be a part of each node (and portal) of a wireless multihop network. The AFSME 330 can include a packet discriminator 335, a TX/RX superframe manager 340, and a transport controller 345. The packet discriminator 335 supports the differentiation of transmissions into different classes and priorities. It can also facilitate multi-services support by further differentiating user traffic into real-time and non-real-time traffic.

The transport controller 345 can be responsible for updating the TX/RX superframe manager 340 to adjust the optimal frame size for transmission based upon wireless link conditions. When operating in a tunneling mode, the transport controller 345 can provide source-to-destination frame size management and can determine the overall quality of the wireless links in the tunnel. The TX/RX superframe manager 340 can be responsible for incoming and outgoing frame processing. The TX/RX superframe manager 340 can create properly formatted frames prior to transmission as well as stripping packets and control information out of received frames.

The operation of the AFSME 330 can differ depending upon whether the wireless multihop network is operating in tunnel or non-tunnel mode. Additionally, in tunnel mode, optimization of the frame size can occur for all wireless links of a single tunnel or for each individual link of a single tunnel.

Figure 4A:
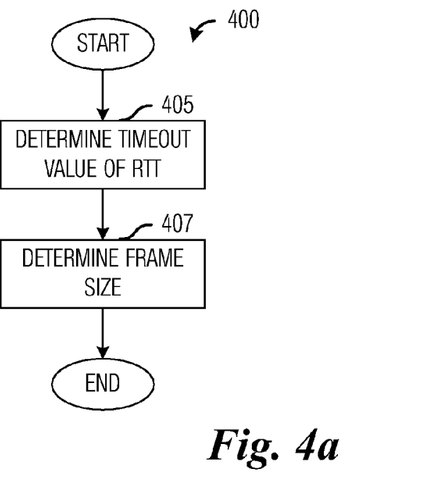
FIGS. 4a through 4c are diagrams of algorithms for use by an adaptive frame size management entity (AFSME) to determine frame size for a wireless multihop network operating in tunnel mode, wherein frame size is optimized for all wireless links of a tunnel, according to a preferred embodiment of the present invention.
Figure 4B:
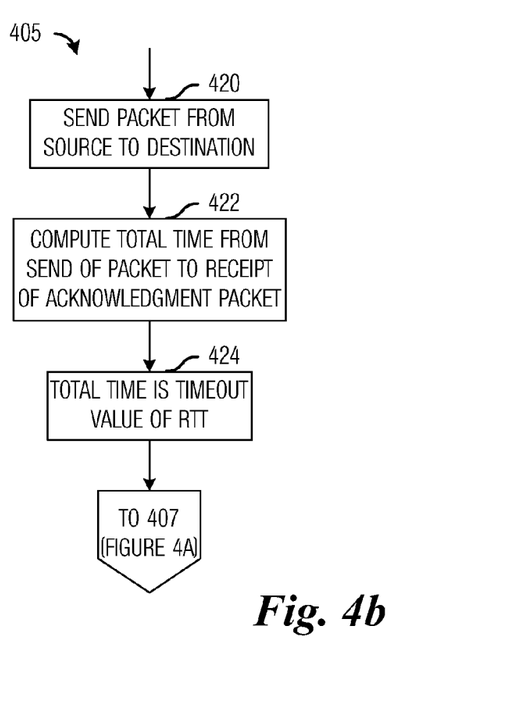
Figure 4C:
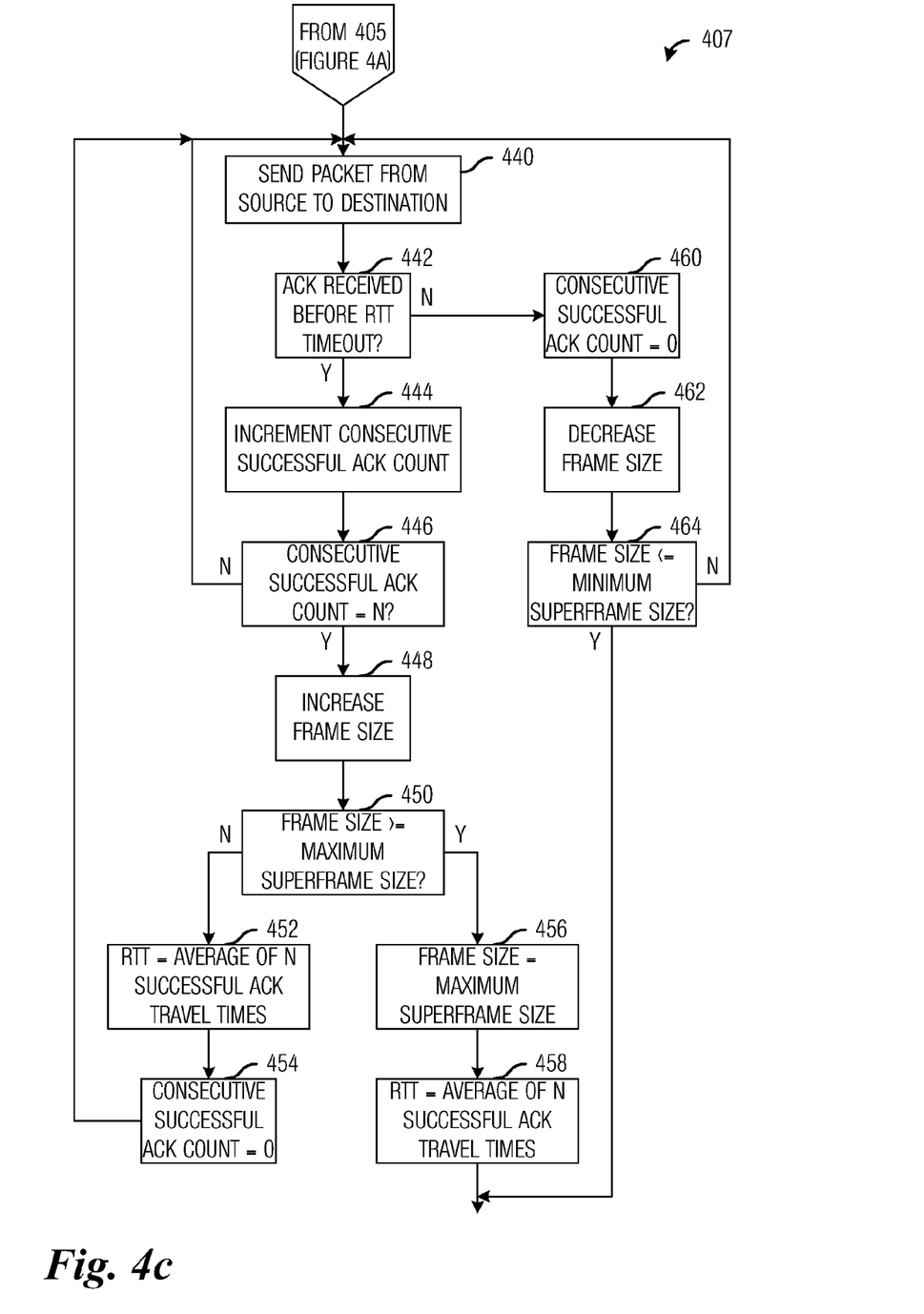

With reference now to FIGS. 4a through 4c, there are shown diagrams illustrating algorithms for use by the AFSME 300 to determine frame size for a wireless multihop network operating in tunnel mode, wherein frame size is optimized for all wireless links of a tunnel, according to a preferred embodiment of the present invention. The determination of an optimum frame size for wireless links can be performed by a transport controller, such as the transport controller 345 (FIG. 3), and can occur at an initialization or configuration of the wireless multihop network or when there is a change to the layout or topology of the wireless multihop network, such as when nodes are added to or removed from the wireless multihop network. The determination of an optimum frame size for wireless links can also be performed based upon measured wireless link quality, such as a packet error rate (PER), frame error rate (FER), a bit error rate (BER), a symbol error rate (SER), and so forth. If a measured wireless link quality drops below a specified level or increases above a specified level, the determination of an optimum frame size may be performed to change the performance of the wireless multihop network due to changing network conditions. As shown in FIG. 4a, an algorithm 400 for use in the determination of the optimized frame size for individual tunnels in the wireless multihop networks can begin with a determination of a timeout value of a round-trip timer (RTT) (block 405). The timeout value of the RTT can be unique for each tunnel and can be dependent on factors such as a number of wireless links in the tunnel, a default data transfer rate, and so forth.

The determination of the timeout value of the RTT can be achieved by simply determining a number of wireless links in a tunnel and multiplying an expected timeout value for a single wireless link by the number of wireless links in the tunnel. Alternatively, a default timeout value can be stored in a memory for different numbers of wireless links and the default timeout value can simply be retrieved and placed in the RTT. With reference now to FIG. 4b, the determination of the timeout value of the RTT can also be made by sending a packet from a source of the tunnel to a destination of the tunnel (block 420). When an acknowledgment packet (ACK) is received from the destination, a total time measuring the travel time of the packet (from the source to the destination) and of the ACK (from the destination to the source) is computed (block 422) and is used as the timeout value of the RTT (block 424). A delta time value can be added to the total time to provide a small measure of protection from minor RTT variation or jitter that may be encountered by subsequent packets but not by the initial packet/ACK combination and that may cause erroneous timeouts that may skew the determination of the optimum frame size.

With reference back to FIG. 4a, after the timeout value of the RTT has been determined (block 405), a determination of the frame size for the tunnel is made (block 407). The determination of the frame size can be based upon RTT timings of transmitted packets and received ACKs and/or upon a measurement of the quality of each of the wireless links in the tunnel. This can be achieved by measuring an error rate, such as a PER, FER, BER, SER, and so forth, for the wireless links in the tunnel and using the error rate to compute a frame size.

With reference now to FIG. 4c, the optimization of a frame size for a tunnel based upon the quality of wireless links in the tunnel can proceed with the transmission of a packet, such as a user data protocol (UDP) packet, from the source node to the destination node of the tunnel (block 440). When the UDP packet is received at the destination node, the destination node will respond with an ACK. When the source node receives the ACK, a determination of whether or not the ACK was received prior to the expiration of the RTT timer is made (block 442). If the ACK was received prior to the expiration of the RTT timer, then a count of consecutive successful ACK packets can be incremented (block 444). If a specified number of consecutive successful ACK packets are received, for example, N (block 446), then the transport controller 345 can increase the frame size by a specified amount (block 448).

A comparison can now be made to determine if the frame size is greater than a maximum allowed superframe size (block 450). The maximum allowed superframe size is a function of the underlying MAC and PHY layers of the wireless network. If the frame size is less than the maximum allowed superframe size, then the timeout value of the RTT timer can be updated with an average of RTT timer values of the N consecutive successful packet/ACK transmissions (block 452), the count of the consecutive successful ACKs is reset (block 454), and the transport controller 345 can return to block 440 to transmit additional packets to possibly increase the frame size. If the frame size is greater than the maximum allowed superframe size (block 450), then the frame size is set to be equal to the maximum allowed superframe size (block 456), the timeout value of the RTT timer can be updated with an average of RTT timer values of the N consecutive successful packet/ACK transmissions (block 458), and the determination of the frame size is complete since the frame size is already at the maximum allowed superframe size.

If the ACK is not received until after the RTT timer expires (block 442), then the count of the consecutive successful ACK packets is reset (block 460), the frame size is decreased to help increase the probability of successful frame transmission (block 462), and the frame size is compared to a minimum allowed superframe size (block 464). Instead of resetting the count of consecutive successful ACK packets and decreasing the frames size upon the receipt of a single ACK after the expiration of the RTT timer, an alternate preferred embodiment of the present invention specifies that several ACKs, each received after the expiration of the RTT timer, may be required before the frame size is decreased and the count of consecutive successful ACK packets is reset, with the specific number being an engineering decision that can be based upon desired performance levels.

If a frame size is less than (or equal to) the minimum allowed superframe size, then the determination of the frame size is complete since the frame size is at the minimum allowed superframe size. When the determined optimum frame size is equal to the minimum allowed superframe size, then a grace period can be implemented wherein there is to be no permitted concatenation of packets. If the frame size is not less than (or equal to) the minimum allowed superframe size, then the transport controller 345 can return to block 440 to transmit additional packets to possibly change the frame size.

A history memory can be added to the algorithm 407 to prevent a potentially disastrous situation from arising, wherein a continuous cycling can occur with a decreasing of the frame size followed by an increasing of the frame size when the determined optimum frame size is not either equal to the maximum allowed superframe size or the minimum allowed superframe size. For example, if a frame size of value K results in the N consecutive successful packet/ACK transmission but a frame size of value L (where L>K) results in an RTT time out, without history information, it may be possible to continuously change the frame size between K and L. Alternatively, an overall time limit may be set to specify a maximum amount of time that can be spent in determining the frame size and if the time spent in determining the frame size exceeds the overall time limit, the determining is stopped. If the overall time limit expires, then the frame size can be set to a largest frame size that did not result in any RTT time outs.

Figure 5A:
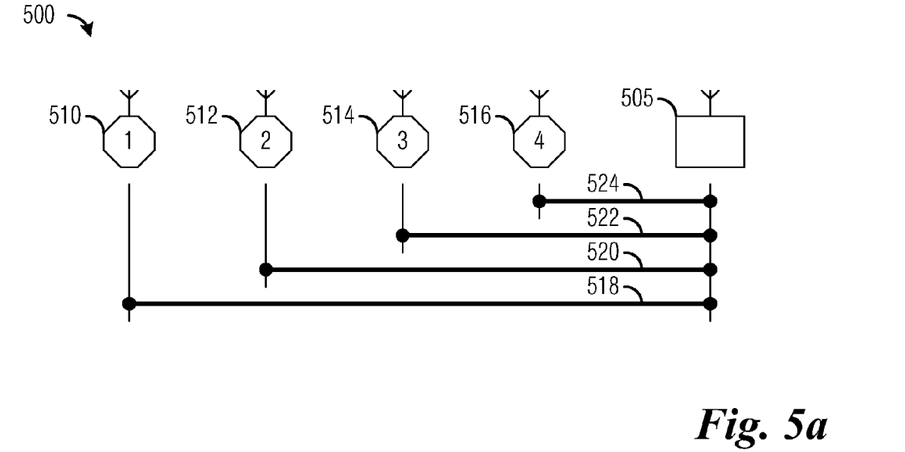
FIGS. 5a through 5c are diagrams of algorithms for use by an AFSME to determine frame size for a wireless multihop network operating in tunnel mode, wherein frame size is optimized for each wireless link of a tunnel, according to a preferred embodiment of the present invention.
Figure 5B:
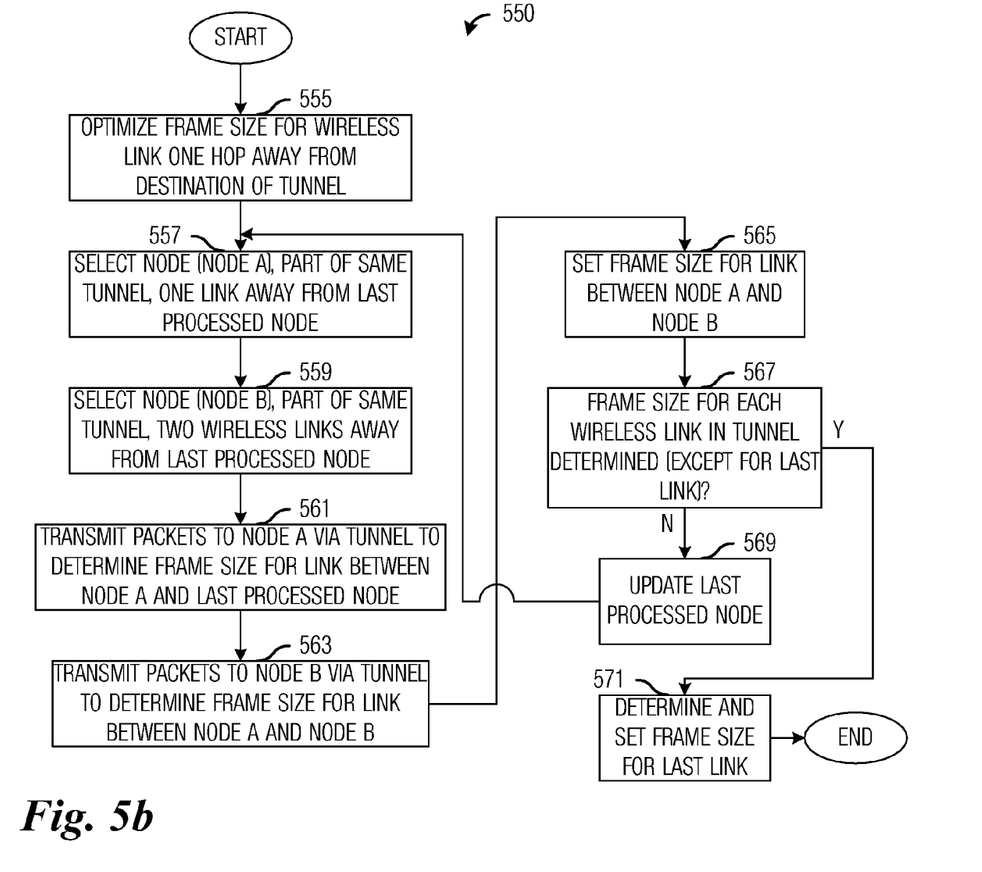
Figure 5C:
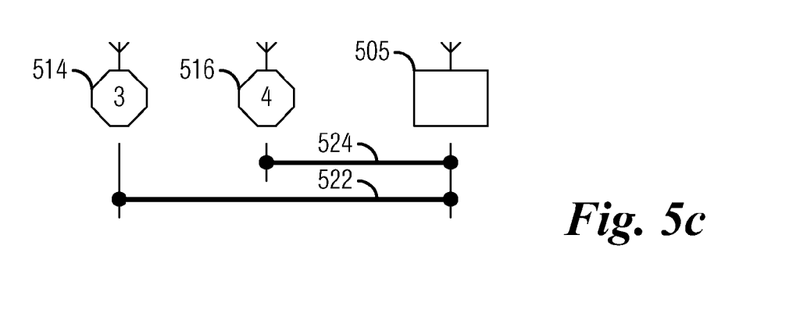

With reference now to FIGS. 5a through 5c, there are shown diagrams illustrating algorithms for use by the AFSME 300 to determine frame size for a wireless multihop network operating in tunnel mode, wherein frame size is optimized for each wireless link of a tunnel, according to a preferred embodiment of the present invention. When the wireless multihop network is operating in tunnel mode, it is further possible to optimize frame size for each wireless link in a tunnel. This is referred to as hierarchical optimization. The optimization of frame size is performed on each wireless link in the tunnel based upon knowledge of tunnel hierarchy. Shown in FIG. 5a, a portion of a wireless multihop network 500 with a portal 505 and a first node 510, a second node 512, a third node 514, and a fourth node 516. Each node is logically connected to the portal 505 via a tunnel, a first tunnel 518 connects the first node 510 to the portal 505, a second tunnel 520 connects the second node 512 to the portal 505, a third tunnel 522 connects the third node 514 to the portal 505, and a fourth tunnel 524 connects the fourth node 516 to the portal 505.

Since a wireless link between the fourth node 516 and the portal 505 is a part of each of the four tunnels, it is the most loaded (heavily used) wireless link in the wireless multihop network 500 shown in FIG. 5a. Since the wireless link between the fourth node 516 and the portal 505 is the most loaded, it is important to ensure that frame size is optimized for this link, with the frame size optimization potentially making use of an algorithm, such as the algorithm 400 (FIGS. 4a through 4c). When such an algorithm is used for frame size optimization, the frame size optimization is performed for the one wireless link tunnel only.

With reference now to FIG. 5b, there is shown a diagram illustrating an algorithm 550 for use in hierarchically optimizing frame sizes in tunnels of a wireless multihop network. The optimization can begin with determination of an optimum frame size for the wireless link connecting a portal (such as the portal 505) to a node (such as the node 516) one wireless link away from the portal (block 555). The optimum frame size determination can make use of the algorithm 400 (FIG. 4a through 4c), for example. After the optimization of the frame size for the wireless link one link away from the portal 505, the optimization can continue with a selection of a node, referred to as node A, that is one wireless link away from a last processed node (block 557). Initially, the last processed node would be the portal 505, so node A would be the fourth node 516. Then, a node that is two wireless links away from the last processed node, referred to as node B, is selected (block 559). Continuing with the example, node B would be the third node 514.

Optimum frame size determination can now be performed for wireless links between the last processed node and node A (block 561) and the last processed node and node B (block 563). Using the optimum frame size determination for the tunnels between the last processed node and node A (block 561) and the last processed node and node B (block 563), it is possible to determine the optimum frame size determination for the wireless link between node A and node B (block 565). A check can then be made to determine if the optimum frame size has been determined for each wireless link in the tunnel, with the exception of the last wireless link (block 567). The last wireless link would be the wireless link connecting the source of the tunnel to a node immediately preceding it, for example, the last wireless link would be a wireless link connecting the first node 510 and the second node 512.

If the optimum frame size has not been determined for each wireless link (excepting the last wireless link), then the last processed node is updated (block 569) and the optimization returns to block 557 to determine the optimum frame size for a next wireless link in the tunnel. The updating of the last processed node may comprise a changing of the current last processed node to a node one wireless link further away from the destination of the tunnel. If the optimum frame size has been determined for each wireless link (except the last wireless link), then the optimum frame size for the last wireless link can be determined and set (block 571) and the algorithm 550 can terminate.

With reference now to FIG. 5c, there is shown a diagram illustrating an exemplary determination of frame sizes using the hierarchical optimization, according to a preferred embodiment of the present invention. For discussion purposes, assume a portion of a wireless multihop network comprising two nodes (node 514 and node 516) and a portal 505. Let the algorithm 400 (FIGS. 4a through 4c) determine that frame size on tunnel 524 should be increased, while frame size on tunnel 522 should be decreased. Since a wireless link between node 516 and the portal 505 is more loaded than the wireless link between the node 514 and the node 516, the frame size in the tunnel 524 should be maintained, while for the wireless link between node 514 and 516, in the downlink direction, the frame size should be decreased until ACK timeouts disappear and in the uplink direction, using smaller frame size and concatenate packets from node 514 to increase to optimal frame size for tunnel 524.

If, under a different set of operating conditions, the algorithm 400 determines that frame size on tunnel 524 should be decreased and frame size on tunnel 522 should also be decreased, then the frame size in both tunnels can be progressively decreased until successive ACKs on the link between the node 516 and the portal 505 are achieved.

The use of hierarchical optimization may require the maintenance of a table of superframe sizes for different wireless links within a single tunnel. This table should be maintained in a portal, with entries for each tunnel connected to the portal. Additionally, a control message may need to be provided to various nodes along the tunnel to advise the nodes of frame size differences.

Figure 6A:
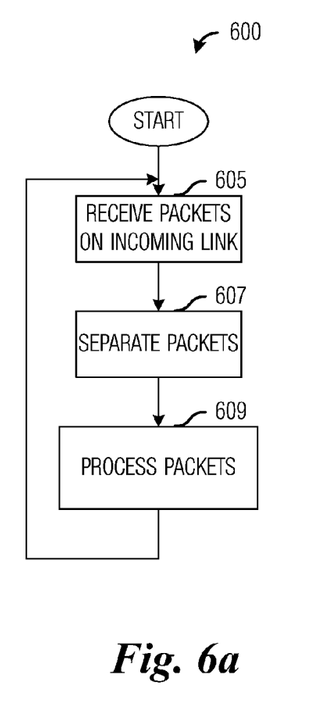
FIGS. 6a through 6c are diagrams of algorithms for use by an AFSME to determine frame size for a wireless multihop network operating in non-tunnel mode, according to a preferred embodiment of the present invention.
Figure 6B:
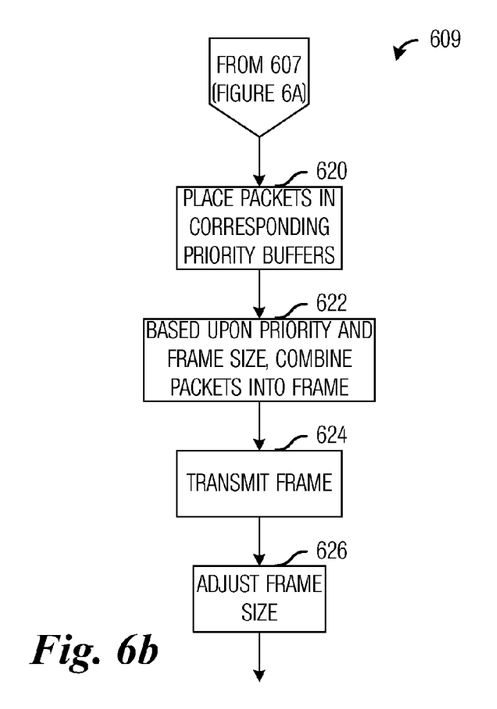
Figure 6C:
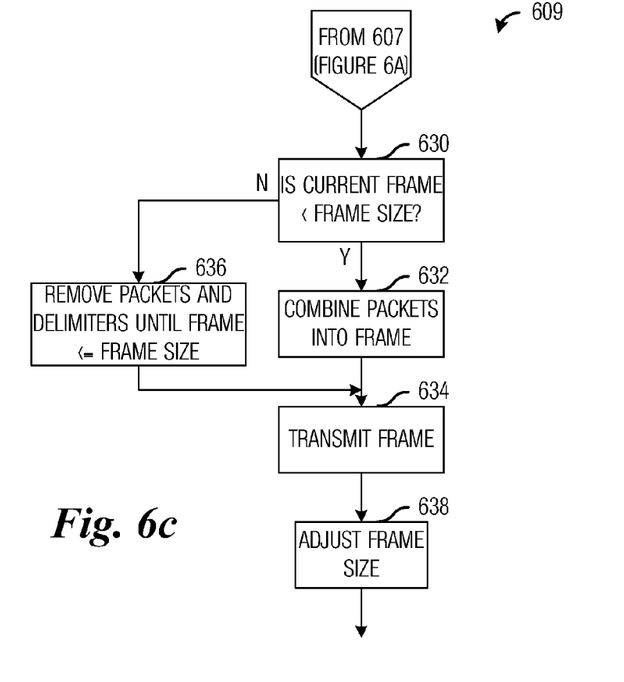

With reference now to FIGS. 6a through 6c, there are shown diagrams illustrating algorithms for use by the AFSME 300 to determine frame size for a wireless multihop network operating in non-tunnel mode, according to a preferred embodiment of the present invention. In addition to the two frame size optimizations possible with the wireless multihop network operating in tunnel mode, frame size optimization can also occur when the wireless multihop network is operating in non-tunnel mode. The frame size determination occurs on a wireless link basis and can be independent of other wireless links.

When the wireless multihop network is operating in non-tunnel mode, all packets going out of a node in the wireless multihop network can be described using one of two descriptors: a packet's next hop routing address or a packet's destination address. Either of the two descriptors can be used to describe all packets leaving any node in the wireless multihop network.

The diagram shown in FIG. 6a illustrates an algorithm 600 for use in the processing of outgoing packets at a node in a wireless multihop network that is operating in a non-tunnel mode. According to a preferred embodiment of the present invention, the algorithm 600 can execute in a TX/RX superframe manager, such as the TX/RX superframe manager 340 (FIG. 3), of each node in the wireless multi-hop network. The TX/RX superframe manager 340 can begin by breaking up incoming frames into individual packets (block 605). Packets that are intended for the node can be processed by higher layers of the node, while packets that are to be forwarded to other nodes (outgoing packets) can be separated by either of the two descriptors (block 607). For any given node in the wireless multihop network, one of the two descriptors can be used, but preferably not both. For example, outgoing packets can be separated by their next hop routing address or their final destination address. Once separated, the outgoing packets can be processed (block 609).

With reference now to FIG. 6b, there is shown a diagram illustrating the processing of outgoing packets having the same next hop routing address, according to a preferred embodiment of the present invention. The processing of packets having the same next hop routing address includes placing the packets into appropriate priority buffers based upon each packets' individual priorities (block 620). After placement into appropriate priority buffers, the packets can be placed into frames based upon their priorities and available space in the frames (block 622) and the frames can be transmitted (block 624). During (and/or after) the transmission of the frames, the frame size can be adjusted based upon ACK packet time-outs, PER, BER, FER, SER, and so forth (block 626).

With reference now to FIG. 6c, there is shown a diagram illustrating the processing of outgoing packets having the same destination address, according to a preferred embodiment of the present invention. The processing of packets having the same destination address includes a determination of whether a current frame being processed is less than the optimal frame size (block 630). If the current frame is less than the optimal frame size, then packets can be combined into the current frame until the current frame reaches the optimal frame size (block 632) and the frame can be transmitted (block 634). If the current frame is greater than the optimal frame size, then packets can be removed from the current frame until the current frame reaches the optimal frame size (block 636) and the current frame can be transmitted (block 634). The addition and subtraction of packets from the current frame can be based upon individual packet priorities, size, available frame space, and so forth. During (and/or after) the transmission of the frames, the frame size can be adjusted based upon ACK packet time-outs, PER, BER, FER, SER, and so forth (block 638).

The frame size used by the TX/RX superframe manager 340 can be determined by application of the algorithm 400 with tunnels being single wireless link tunnels. Alternatively, the frame size can be determined during normal operation of the wireless multihop terminal with a round-trip timer measuring the receipt of an ACK packet for every frame transmitted. If an ACK packet is not received before an expiration of the round-trip timer, then the frame size can be decreased. Similarly, if multiple consecutive successful ACK packets are received, then the frame size can be increased. When operating in non-tunnel mode, the TX/RX superframe manager 340 of each node of the wireless multihop network can determine if packet concatenation will take place. Furthermore, if the quality of the wireless link (as indicated by the wireless link's FER, PER, BER, SER, and so on) is higher than a predefined threshold, then packet concatenation can be disabled.

Figure 7A:
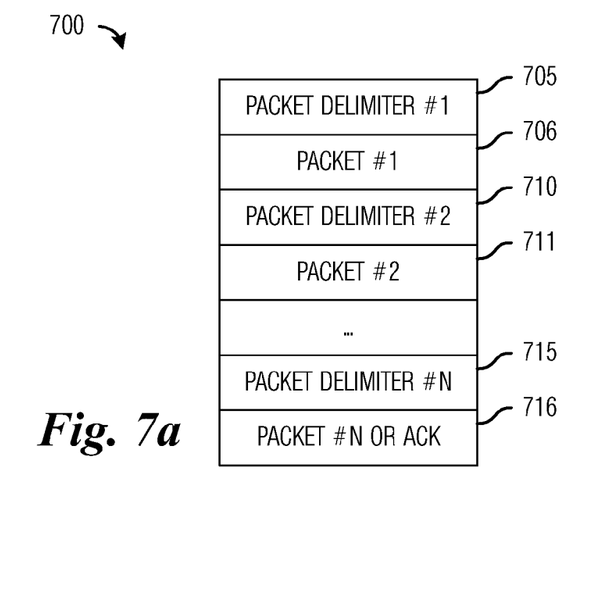
FIGS. 7a and 7b are diagrams of frame format and packet delimiter format, according to a preferred embodiment of the present invention.
Figure 7B:
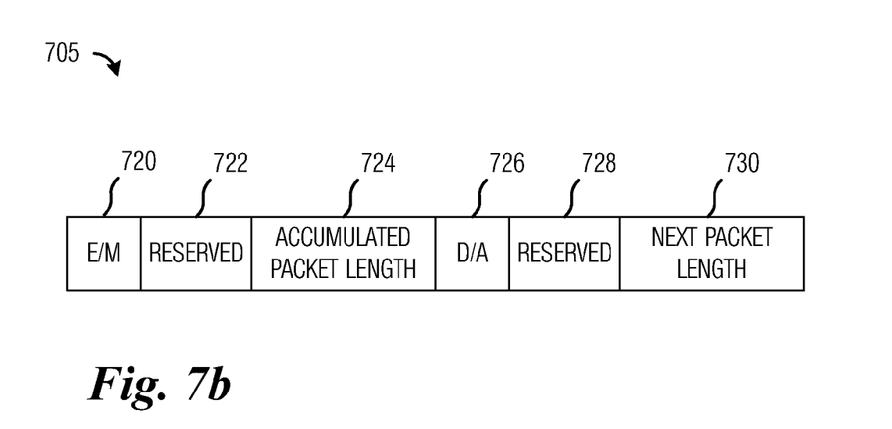

With reference now to FIGS. 7a and 7b, there are shown diagrams illustrating frame format and packet delimiter format, according to a preferred embodiment of the present invention. The diagram shown in FIG. 7a illustrates a frame 700 made up of a plurality of packets. The frame 700 may begin with a delimiter 705 for a first packet 706, which can immediately follow the delimiter 705. Additional packets are also separated by delimiters. For example, a delimiter 710 for a second packet 711 separates the first packet 706 from the second packet 711. A delimiter 715 can separate an N-th packet or an ACK packet 716.

The diagram shown in FIG. 7b illustrates a detailed view of a delimiter, such as the delimiter 705. The delimiter 705 comprises a plurality of fields, with a first field 720 being an End/More (E/M) field indicating if there are more packets to follow, a second field 722 is reserved for future use, a third field 724 is a value representing a total length of the remainder of the frame, a forth field 726 is a Data/Ack (D/A) field indicating if the next packet is user data or an ACK packet, a fifth field 728 is reserved for future use, and a sixth field 730 is a value representing a length of a next packet.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention.

Accordingly, the appended claims are intended to include within their scope such processes, machines, manufacture, compositions of matter, means, methods, or steps.

What is claimed is:

1. A method for determining frame size in a wireless multihop network, the method comprising:
   transmitting a packet from a source to a destination;
   receiving an acknowledgement packet at the source;
   incrementing a successful acknowledgement packet counter upon a determination that the acknowledgement packet arrived at the source prior to a time-out of a timer;
   increasing the frame size upon a determination that the successful acknowledgement packet counter has reached a specified value;
   upon a determination that the acknowledgement packet arrived at the source after the time-out of the timer,
      resetting the successful acknowledgement packet counter;
      decreasing the frame size; and
   repeating the transmitting, the receiving, the incrementing, the increasing, the resetting, and the decreasing until the frame size is greater than or equal to a maximum frame size or less than or equal to a minimum frame size.

2. The method of claim 1, wherein if the frame size is less than or equal to the minimum frame size, then concatenating packets into frames is prohibited for a specified amount of time.

3. The method of claim 1 further comprising resetting the successful acknowledgement packet counter upon the determination that the successful acknowledgement packet counter has reached the specified value.

4. The method of claim 1 further comprising prior to the transmitting, determining an initial value for the timer.

5. The method of claim 4, wherein the determining of the initial value comprises:
   transmitting a second packet between the source and the destination;
   receiving a second acknowledgement packet; and
   setting the initial value based upon a time between the transmitting of the second packet and the receiving of the second acknowledgement packet.

6. The method of claim 4, wherein the initial value is computed from an expected time value for each wireless link spanning the source and the destination and a number of wireless links spanning the source and the destination.

7. The method of claim 1, wherein there is a plurality of source and destination pairs in the wireless multihop network, and wherein the method is used to determine a frame size for each source and destination pair.

8. The method of claim 1, wherein there is a plurality of wireless links spanning a path from the source to the destination, and wherein the method is used to determine a frame size for each wireless link in the plurality of wireless links.

9. The method of claim 8, wherein a priority is given to a wireless link depending upon an amount of traffic that traverses it, and wherein the determination of the frame size is dependent upon the wireless link's priority.

10. The method of claim 1 further comprising updating the timer with an average time elapsed between transmitting a packet and receiving an acknowledgement for each of the specified values of successful packet transmissions and acknowledgement receipts upon the determination that the successful acknowledgement packet counter has reached the specified value.

11. The method of claim 1, wherein the resetting and the decreasing does not occur until the source receives a specified number of acknowledgement packets arriving at the source after the time-out of the timer.

12. A method for determining frame size in a wireless multihop network, the method comprising:
   sending a packet from a source to a destination;
   receiving an acknowledgement packet from the destination at the source;
   setting a timeout interval of a timer;
   reducing a frame size if the acknowledgement packet is not received from the destination within the timeout interval;
   increasing the frame size if a predetermined number of successive acknowledgement packets are received and meet the timeout interval; and
   repeating the sending, the receiving, the reducing, and the increasing until the frame size is greater than or equal to a maximum frame size or less than or equal to a minimum frame size.

13. The method of claim 12, wherein if the frame size is less than or equal to the minimum frame size, then concatenating packets into frames is prohibited for a specified amount of time.

14. The method of claim 12, wherein the setting a timeout interval of a timer comprises:
   transmitting a second packet between the source and the destination;
   receiving a second acknowledgement packet from the destination at the source; and
   setting the timeout interval based upon a time between the transmitting of the second packet and the receiving of the second acknowledgement packet.

15. The method of claim 12, wherein the timeout interval is computed from an expected time value for each wireless link spanning the source and the destination and a number of wireless links spanning the source and the destination.

16. The method of claim 12, wherein the wireless multihop network comprises a plurality of source and destination pairs in the wireless multihop network, and wherein the method is used to determine a frame size for each source and destination pair.

17. The method of claim 12, wherein the wireless multihop network comprises a plurality of wireless links spanning a path from the source to the destination, and wherein the method is used to determine a frame size for each wireless link in the plurality of wireless links.

18. The method of claim 17, wherein a priority is given to a wireless link depending upon an amount of traffic that traverses it, and wherein the determination of the frame size is dependent upon the priority of the wireless link.

19. The method of claim 12, further comprising updating the timer with an average time elapsed between transmitting a packet and receiving an acknowledgement for each of the successive acknowledgement packets upon the determination that the predetermined number of successive acknowledgement packets has been received.

20. The method of claim 12, wherein the reducing does not occur until the source receives a specified number of acknowledgement packets arriving at the source after the timeout interval of the timer.

* * * * *